Figure 7:
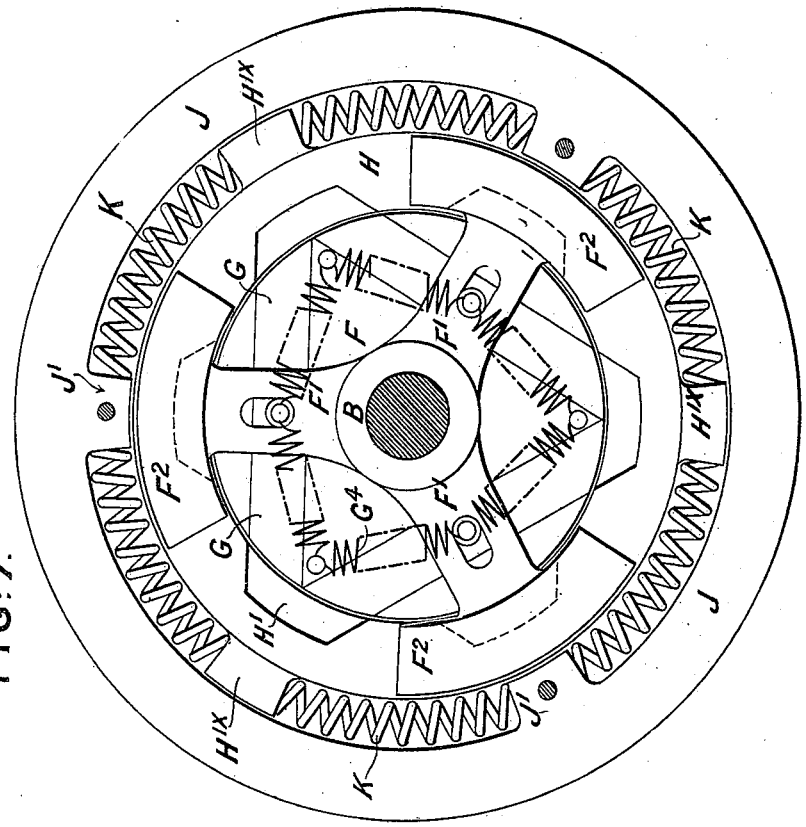

No. 670,203.  
W. KINGSLAND.  
APPARATUS FOR CONTROLLING THE MOTION OF ELECTRICAL SWITCHES.  
(Application filed Aug. 9, 1900.)  
Patented Mar. 19, 1901.
(No Model.)  
3 Sheets—Sheet 1.
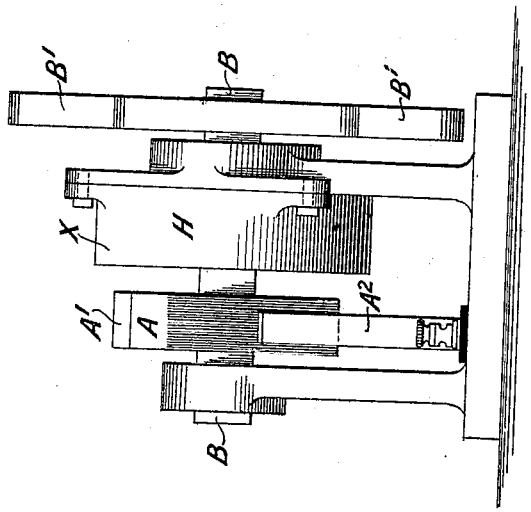
FIG: 2.
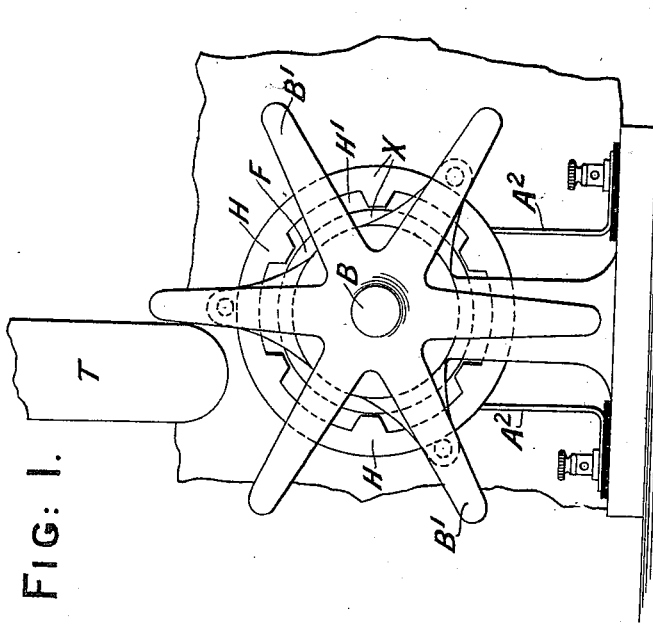
FIG: 1.
Witnesses  
Chas H Smith  
J. Staib
Inventor  
William Kingsland  
per L. W. Serrell & Son  
attys No. 670,203. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.) 3 Sheets—Sheet 2.
FIG: 3.
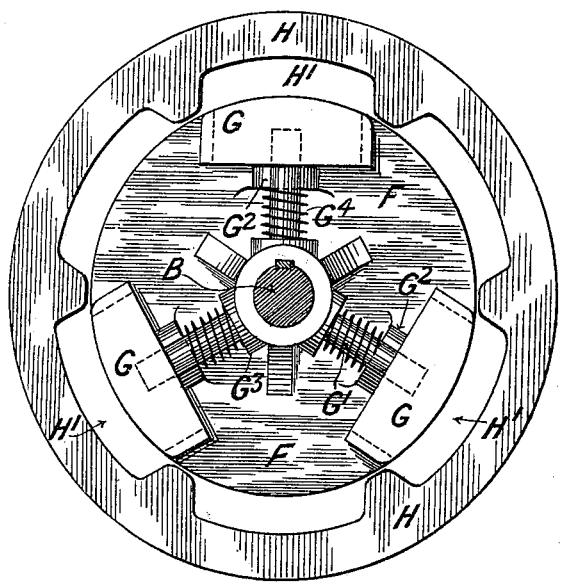
FIG: 4.
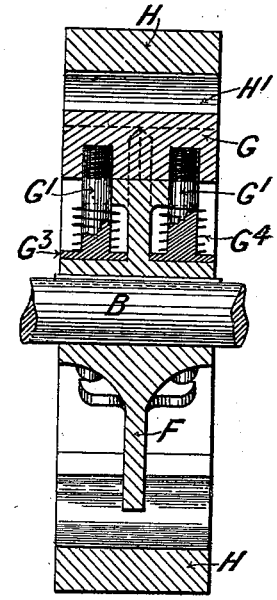
FIG: 5.
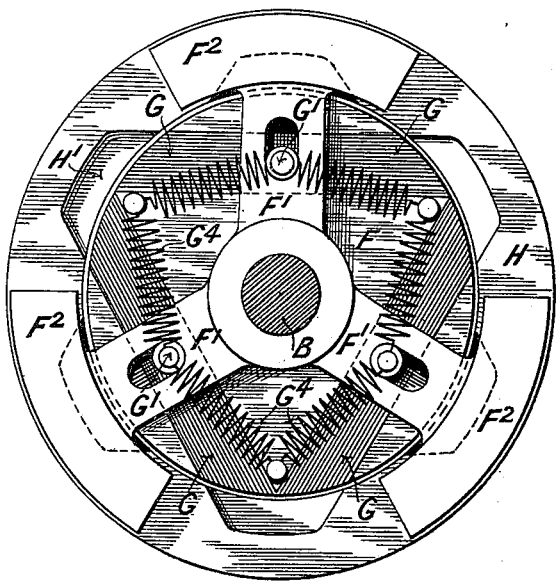
FIG: 6.
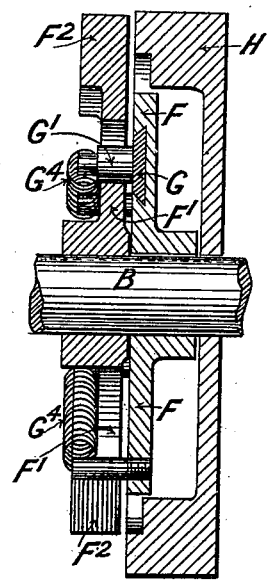
Witnesses
Chas. H. Smith
J. Staib
Inventor
William Kingsland
per L. W. Serrell & Son
attys No. 670,203. Patented Mar. 19, 1901.
W. KINGSLAND.
APPARATUS FOR CONTROLLING THE MOTION OF ELECTRICAL SWITCHES.
(Application filed Aug. 9, 1900.)
(No Model.)
3 Sheets—Sheet 3.

Witnesses
Chas H. Smith
J. Staib

Inventor
William Kingsland
per L. W. Serrell & Son
attys

UNITED STATES PATENT OFFICE.

WILLIAM KINGSLAND, OF LONDON, ENGLAND.

APPARATUS FOR CONTROLLING THE MOTION OF ELECTRICAL SWITCHES.

SPECIFICATION forming part of Letters Patent No. 670,203, dated March 19, 1901.

Application filed August 9, 1900. Serial No. 26,319. (No model.)

*To all whom it may concern:*

Be it known that I, WILLIAM KINGSLAND, electrical engineer, of 8 Breams Buildings, Chancery Lane, in the city of London, England, have invented a certain new and useful Apparatus for Controlling and Regulating the Motion of Electric Switches which are Operated by Tappet Action, (for which I have made application for patent in Great Britain under No. 1,618, dated January 25, 1900,) of which the following is a specification.

In electrical switches which are employed to connect and disconnect an electrical circuit and are operated by means of a tappet action it may and frequently does happen that the moving part or parts of the switch acquire (as the result of such tappet action) greater momentum than is necessary to carry out the required amount of movement of the switch, and that amount of the momentum which is unrequired to effect the requisite change in position of the switch is detrimental, in that it may carry the moving part of the switch beyond the position which it is desired it should assume or produce injury to the parts.

Now the object of my invention is to provide means whereby the motion of the switch is automatically stopped and locked after it has moved through the required distance, and its motion having been so stopped the switch is then automatically released preparatory to the next action of the tappet thereon; and with this object in view I apply my locking and releasing mechanism to a rotative shaft by which the switch is operated, the rotative shaft receiving its motion by the impact of a moving tappet bar or bars.

My invention is applicable to any switch which is operated by a tappet action, and particularly to switches employed in electrical traction, where the said switches are to be operated mechanically by a tappet-arm carried by or connected to a motor-vehicle moving at various speeds along a line of rails.

Figure 8:
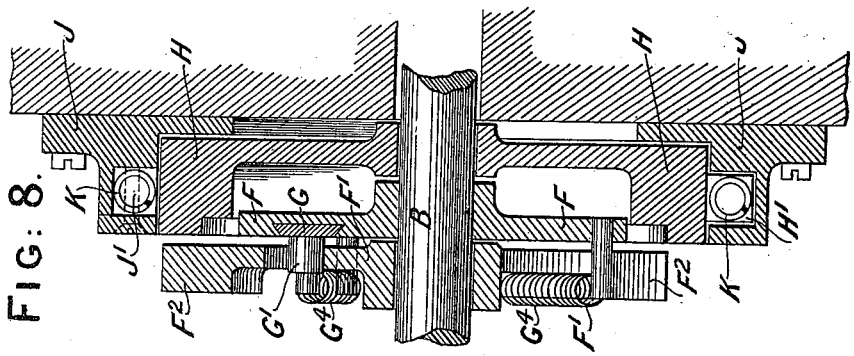

Referring to the drawings, Figure 1 represents an end elevation of my invention as applied to a rotative form of switch actuated by a tappet action. Fig. 2 is a side elevation of the same. Fig. 3 is an end elevation in detail of the locking mechanism of the switch when the same is actuated by centrifugal force. Fig. 4 is a vertical transverse section of the same. Fig. 5 is an end elevation showing in detail the locking mechanism when the same is actuated by the inertia of weights. Fig. 6 is a vertical transverse section of the same; and Figs. 7 and 8 show a modification of the devices shown in Figs 6 and 7, respectively.

I will describe my invention, by way of example, in its application to a known rotative form of switch actuated by a tappet action, such as in part illustrated with reference to Figs. 1 and 2 of the accompanying drawings, Fig. 1 being an end view, and Fig. 2 a side elevation, of same. This example of switch is composed of a cylinder A, made of some insulating material fixed upon a rotative shaft B and having upon a portion of its circumference a conducting plate or plates A', there being contact springs or brushes $A^2 A^2$ pressing against the surface of the cylinder A and electrically connected, respectively, say, to a main conductor and a sectional conductor in a sectional-conductor system of electrical traction. Mounted upon the rotative shaft B of the switch is a tappet-wheel B', having several arms, which latter are successively operated by tappets carried by the vehicle as the latter passes along the track in such manner as to give the tappet-wheel B' a partial turn or partial turns every time a vehicle passes. In such a form of switch mechanism I apply my automatically-acting locking and releasing device (indicated by the letter X) to the shaft B, as hereinafter described. My said locking and releasing device consists of locking-bolts which are carried by a disk or frame F, fixed to the shaft B, and when the disk F is rotated by the tappet action the said bolts are thrown outward by means of weights which are caused to act either by centrifugal force or by the effect of the inertia of a weight or weights against the action of springs. When the bolts are thus thrown outward, they engage in recesses in a ring H, which is rigidly held and is stationary, and definitely stop further motion, the said bolts being then immediately withdrawn by springs.

I have shown an arrangement of the aforesaid parts, where the apparatus acts by centrifugal force, at Figs. 3 and 4, Fig. 3 being an elevation and Fig. 4 a transverse section. Referring to these figures, I provide upon the disk F, which is fixed to the tappet-shaft B, weighted bolts or blocks G, capable of moving radially outward when the disk F is rotated, the said bolts G sliding in guides, formed, say, by slots in the periphery of the disk F, such outward motion of the bolts G being produced by the centrifugal force generated by the rotation, and these bolts G are held toward the center of rotation of the disk F by means of springs $G^4$. Thus, as shown, the bolts G have inwardly-extending radial plungers $G'$, passing freely through lugs $G^2$ on the disk F, and are formed with heads $G^3$, springs $G^4$ acting between the heads $G^3$ and the lugs $G^2$ to draw the bolts G inward. Surrounding the periphery of the disk F, I provide the stationary ring H, the inner periphery of which is formed with recesses $H'$, equal in number to the number of arms on the tappet-wheel, (there being six of such arms in the example now dealt with,) the recesses $H'$ being of such size as to permit the entry therein of the bolts G, while the inner parts of the stationary ring H between the recesses approach the periphery of the disk F. By such an arrangement of parts when the tappet-shaft B, and consequently the disk F, is rotated the bolts G will be thrown radially outward and will be caused to bear against the inner projecting parts of the stationary ring H until the bolts G arrive opposite to the next recesses, into which they will momentarily enter and stop positively further rotative motion of the disk. Immediately after this stoppage the bolts G will be instantly withdrawn by their springs $G^4$ and the device will be in position for the next tappet action.

Instead of the bolts G being brought into operation (during the rotation of the tappet-shaft) by the action of the centrifugal force such bolts may by another arrangement of the mechanism be actuated by the inertia of weights, and at Figs. 5 and 6 I have shown an example of such an arrangement of parts, Fig. 5 being an elevation and Fig. 6 a transverse section. In this arrangement of mechanism I fit the bolts G in grooves formed in the face of the disk F, which is keyed to the shaft B, the bolts being capable of sliding freely in such grooves. The bolts G are normally held in the position shown by the balancing-springs $G^4$, so that their ends coincide with the periphery of the disk F. A pin $G'$ projects from each bolt G about centrally of the length thereof and enters into a radially-extending slot formed in a radial arm $F'$, capable of freely turning about the tappet-shaft B. The outer ends of these radial arms $F'$ are weighted at $F^2$. A stationary ring H, as described in the last arrangement, surrounds the bolt-carrying disk F. When the disk is revolved by the tappet motion, the action of the weights $F^2$ produces a slight rotary motion of the radial arms $F'$ relatively to the disk F, and thereby forces one end of each sliding bolt G outwardly from the periphery of the disk F, bringing the ends of the bolts G into contact against the inner projecting parts of the stationary ring H, then causing the bolts to enter the next recesses of the said ring H to definitely stop the rotative movement of the disk, after which the bolts G are returned to their normal positions by means of the balancing-springs aforesaid and the device is ready to receive the next tappet action.

When it is considered advisable that the effect of the impact of the tappet action and stop device should be lessened by allowing of a certain amount of resilient motion and utilizing the power that is accumulated to return the devices to the required position, I then, instead of fixing the outer ring H rigidly and making the same absolutely stationary, mount such ring as shown at Figs. 7 and 8. In these figures the stopping and releasing mechanism carried by the shaft B is precisely the same as that described with reference to Figs. 5 and 6; but the ring H, instead of being fixed to the framework, is provided with lugs $H'^\times$ on its outer periphery, which lugs enter an annular recess formed in the ring J, and the ring J is rigidly fixed to the framework, the ring H being capable of rotary motion within the ring J. The annular recess of the ring J is divided by inwardly-projecting parts $J'$, and between such parts $J'$ and the lugs $H'^\times$ of the ring H springs K are inserted, which act as balancing-springs. By this construction when the bolts G engage in the recesses $H'$ rotary motion will not be suddenly stopped, but any remaining surplus energy will be taken up by the springs K, and the apparatus—that is, the ring H and the part carrying the bolts G—will be brought back by the springs to the predetermined and required position.

What I claim as my invention, and desire to secure by Letters Patent, is—

1. The combination with an electrical switch for connecting and disconnecting an electrical circuit, a rotative shaft by which motions are communicated to the switch, and tappet mechanism by which the operating-shaft receives step-by-step rotative motion by the impact of passing tappets; of a disk carried by the shaft, locking-bolts carried by the disk, a stationary ring surrounding the disk, and recesses in the interior of the ring to receive the locking-bolts when the latter are projected beyond the periphery of the disk, means whereby the bolts are projected upon and by the rotative motions of the disk, and caused to enter the next set of recesses in the stationary ring, in order to stop the motion of the shaft, and means whereby the bolts are automatically withdrawn from the ring-recesses after the stoppage of rotation of the shaft, to free the shaft for the next tappet action, substantially as described.

2. In an electrical switch for connecting and disconnecting an electrical circuit and which is worked by an operating-shaft receiving step-by-step rotative motion by the impact of passing tappets; the combination with the said operating-shaft, a disk fixed thereon, sliding locking-bolts carried in guides on the disk, springs to normally hold the acting ends of the bolts out of action, and weights in connection with the bolts to throw out the acting ends of the latter upon and by the rotation of the disk; of a stationary ring secured to the framework and surrounding the disk aforesaid, and recesses in the interior of the said ring to receive the locking-bolts when the latter are projected beyond the periphery of the disk, and to thereby stop the motion of the disk and operating-shaft, the bolts being immediately withdrawn from the recesses of the ring by the aforesaid springs to free the operating-shaft for the next tappet action, substantially as set forth.

3. In an electrical switch for connecting and disconnecting an electrical circuit and which is worked by an operating-shaft receiving step-by-step rotative motion by the impact of passing tappets; the combination with the said operating-shaft, a disk carried thereby, sliding locking-bolts carried by guides on the disk, springs to normally hold the acting ends of the bolts from being projected beyond the periphery of the disk, and weights in connection with the bolts to throw out the acting ends of the latter upon and by the rotation of the disk; of a ring surrounding the disk aforesaid, and recesses in the interior of the said ring to receive the locking-bolts when the latter are projected beyond the periphery of the disk, a stationary frame to carry the recessed ring, and spring connections between the stationary frame and the ring, to limit any partial rotative movement of the said ring, to absorb the shock produced by the entry of the locking-bolts into the recesses of the ring and the consequent stoppage of the mechanism, and to return the ring to its normal position, after which the locking-bolts are automatically withdrawn from their acting position and the operating-shaft is free for the next operation, substantially as set forth.

4. The combination with an electric switch, a rotative operating-shaft by which the switch is worked, a tappet-wheel on the said shaft by which the latter receives step-by-step rotation by the impact of passing tappets; a disk fixed upon the shaft, sliding bolts carried in guides on the face of the disk and capable of being projected beyond the periphery thereof, springs to normally hold the bolts within the periphery of the disk, weighted arms carried loosely on the shaft, connections between the weighted arms and the bolts, so that the bolts will be forced beyond the periphery when the disk is rotated by reason of the inertia or resistance to motion of the weighted arms; of a ring surrounding the disk, means for elastically holding the ring in one position, and recesses in the interior periphery of the ring into which the bolts enter upon rotation of the disk, and thereby stop the motion of the switch-shaft, the latter being then released by the withdrawal of the bolts by the springs aforesaid, substantially as set forth.

WILLIAM KINGSLAND.

Witnesses:
GRIFFITH BREWER,
THOMAS WILLIAM ROGERS.